Figure 1:
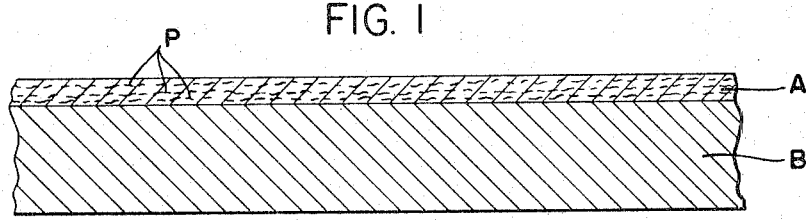

Jan. 17, 1967  A. SZEGVARI  3,298,034
ARTICLES OF WEARING APPAREL
Filed May 23, 1962

INVENTOR.
ANDREW SZEGVARI
BY
ATTORNEY 3,298,034
ARTICLES OF WEARING APPAREL
Andrew Szegvari, 201 Castle Blvd., Akron, Ohio 44313
Filed May 23, 1962, Ser. No. 197,117
6 Claims. (Cl. 2—168)

This application is a continuation-in-part of application Serial No. 464,001 filed October 22, 1954, now abandoned.

This invention relates to the production of dipped, laminated plastic articles of wearing apparel, at least one ply being formed from a latex-type liquid in which the film-forming material is suspensoid in character and forms a discontinuous internal phase, and another ply being formed from a cement- or solvate-type system in which the film-forming material is present in a continuous phase. The latex ply is deposited on a ply formed from the cement-type of liquid. The ply formed from the latter contains finely divided pigment uniformly dispersed in it in a very high state of microscopic homogeneity. The invention includes the process of dipping products first in a pigmented cement-type of material and then in a latex-type of liquid.

"Cement" is used herein to refer to a plastic-type high-molecular-weight elastomeric material solvated in a volatile solvent which peptizes the plastic preferably to a low-viscosity fluid. The plastic may, for example, be rubber, a synthetic rubber, a vinyl resin, chlorinated rubber, etc. The solvent will depend upon the nature of the plastic, and may, for example, be methyl alcohol, ethyl alcohol, butyl alcohol or other low-boiling alcohol; methyl acetate, amyl acetate, ethyl butyrate or other ester; methylethyl ketone or other ketone; a low-boiling coal tar or petroleum fraction, etc. By low boiling I mean a solvent which evaporates sufficiently rapidly under conditions of commercial production to permit cements made therefrom to be used in large scale dipping operations, with subsequent rapid evaporation of the solvent therefrom.

Dispersion of the pigment in the cement may be accomplished in a ball mill or the like, or preferably a device such as described in my U.S. Patent 2,764,359 granted September 25, 1956, in which small substantially spherical attritive elements of substantially the same diameter immersed in a liquid in a vessel are agitated by agitating means so that substantially all of the elements are kept in constant motion and are repeatedly brought into substantially instantaneous contact with one another while being kept out of static contact with one another. A latex-type system in which the film-forming substituent is suspensoid, when subjected to such treatment is coagulated. However, a cement-type liquid containing a pigment may be subjected to such treatment satisfactorily. The pigment may be ground as it is dispersed. It may be ground to as small as .05 to 1.0 micron. No coagulation of the cement occurs.

These two types of systems, the latex type and the cement type, have entirely different properties and different conditions affect and control the films deposited from them. Latex-type systems can be obtained with very high concentrations of the film-forming component, much higher than are obtainable with the cement-type systems, and methods have been developed by which deposits of considerable thickness can be formed in a single dipping operation, much thicker than are obtainable by a single dipping in a cement-type system. The so-called coagulant process is most widely used for that purpose. Because of the rapidity with which thick deposits can be obtained, the latex-type system is generally preferred to the cement type, where the circumstances are such that it can be used.

The latex-type systems have certain limitations, imposed to large extent by the nature of the suspended film-forming constituent. For instance, it is difficult or impossible to incorporate many finely divided materials in such systems. For example, the reinforcement of rubbers by carbon black and certain other reinforcing pigments such as silica, etc. require that the pigment be distributed in the film-forming component with microscopic homogeneity. The suspended particles of the film-forming component of the latex-type system have a diameter (or other through measurement) of $\frac{1}{10}$ to 1 micron, and usually even larger, which is so large as to prohibit obtaining microscopic homogeneity of a pigment therein, and grinding causes coagulation. Likewise, it is impossible to incorporate in most latex-type systems, materials which have a positive electric charge or a great tendency for kinetic instability, regardless of the degree of homogeneity required. Such materials cause flocculation in such systems making them difficult to use in industrial processing. Some organic bases, such as diphenyl guanidine, etc. cause coagulation of the latex-type system. Inorganic bases such as magnesium oxide, calcium oxide, etc. also act as coagulants.

Cement-type systems are usually high in viscosity even in low concentrations and therefore only thin films can be dipped in one step. On the other hand, a very high degree of microscopic homogeneity is obtainable if the fundamental matrix is entirely solvated, particularly if suitable process means is employed such as is described in my aforesaid patent. Furthermore, the matrix in the solvated condition acts as a protective colloid in the distribution of pigments, which is particularly valuable in the distribution of pigments which are difficult to disperse.

The process lends itself to the production of a great variety of products. For instance, pigments such as carbon black, zinc oxide, etc. may be dispersed in a cement for dipping the surface ply of a product which must be abrasion resistant. Expensive coloring pigments, such as silver or gold powder, etc. may be used in minimum amounts by incorporating them in a thin surface ply only. Neoprene may be pigmented with finely divided magnesium oxide for curing. Products formed of a first ply dipped from cement-type systems may be covered and rapidly built up to a desired thickness by subsequent dipping in a latex-type system. It may be desirable to have the surface ply free of pigments and to incorporate them only in an under ply, and the pigment is then located in one ply dipped from a cement-type system, the surface ply dipped from a cement-type system being entirely free of pigment for chemical reasons, physical reasons, economic reasons, etc., except that if the film-forming material is to be cured, the curing ingredients are suspended in the system. Thus, the invention lends itself to the production of footwear, belts (for industrial uses and personal wear), gloves, other wearing apparel, toys, etc.

The following preferred procedure utilizes both systems and gives a product in which the film-forming material deposited from the latex-type system is firmly adhered to a film-forming material deposited from a cement-type system. The form is first dipped into a cement-type liquid containing the controlling pigments uniformly distributed therein. The deposit is evaporated to dryness. The dry film is heated to a temperature above 120° F., and preferably 160° F., or thereabouts, and in this warm condition is dipped into the latex-type liquid. This film is semi-dried, and then dipped into a coagulant, of which there are many such as acetic or hydrochloric acid in water, calcium nitrate in water, calcium chloride plus zinc chloride in alcohol, calcium chloride in a mixture of alcohol and acetone, ammonium borate plus boric acid in water. The form covered with a film deposit is then generally dipped into the same or a different latex-type liquid and left there for the time required to form a deposit of the required thickness.

(Several dips in the same or different suspensoids, may be used with intervening dips in coagulant.) The article is then preferably washed, and is then dried and if it is curable, it is then cured.

Figure 2:
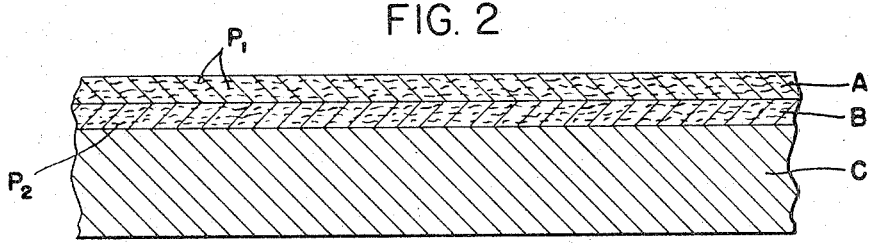

The invention is illustrated in the accompanying drawings which illustrate, on a magnified scale, sections through different products, FIGURE 1 illustrating a product with a thin surface ply of film-forming material containing pigment uniformly distributed therein in a high state of microscopic homogeneity on a thicker ply of coagulated latex-type film-forming material;

FIGURE 2 illustrating a product with two adjoining thin pigmented plies; and

Figure 3:
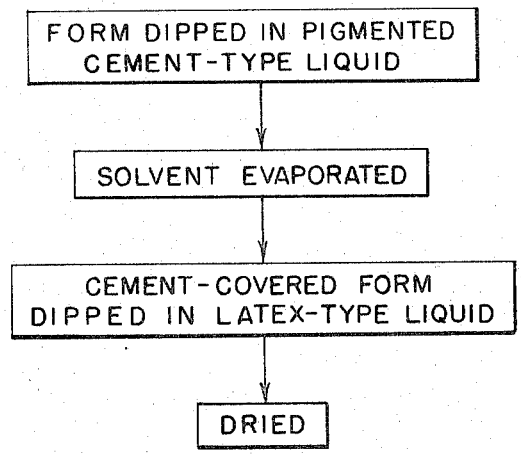

FIGURE 3 is a flow sheet of the process.

FIGURE 1 illustrates a section through a laminated product of two plies. Ply A may be the inner or outer ply. It is deposited from a cement-type liquid and contains the pigment P. The ply B is deposited from latex-type liquid, and is formed on ply A deposited from cement-type liquid. The film former of ply B may be the same as that in ply A, or different. For instance, both may be Hevea rubber or both may be a vinyl resin. Except for the pigment they may be compounded the same so that they vulcanize simultaneously, or they may be compounded differently. Alternatively, the different plies may be composed of different plastics, e.g. ply A may be a vinyl resin, chlorinated rubber, etc. and ply B may be natural rubber, butadiene-styrene synthetic rubber, a neoprene, etc.

In FIGURE 2, the plies A and B are pigmented and deposited from cement-type liquids. Ply C is deposited from latex-type liquid. The plastic of the ply C may be the same as that of both plies A and B, if the same; or the same as either ply A or B, if different; or different from both plies A and B. If plies A and B are both formed from the same plastic, the pigments P–1 and P–2 may be different, or the pigments in these two plies may be the same and used in the same or different proportions. If the plastics in plies A and B are different, the pigments P–1 and P–2 may be the same or different.

The invention is further illustrated by the following examples.

*Example 1.—Overshoes*

In making an overshoe, a porcelain form is used which is of such dimensions that when the goods produced are turned inside out they have the proper dimensions.

The form is first dipped at the parts which should have a wear-resistant surface, for instance, the sole and heel. A cement-type liquid is used for this purpose which is made as follows:

| | Parts by weight |
|---|---|
| Natural rubber | 100 |
| Furnace black (fine particle size) | 30 |
| Zinc oxide | 5 |
| Altax [1] | 1.1 |
| Tuads [2] | 0.2 |
| Sulfur | 3 |
| Agerite powder [3] | 1 |
| Stearic acid | 1 |

[1] Altax is essentially benzothiazyl disulfide.
[2] Tuads is essentially tetramethylthiuram disulfide.
[3] Agerite Powder is essentially di-beta-naphthyl-para-phenylenediamine.

The foregoing mixture is intimately ground into equal parts of petroleum naphtha and toluene to obtain a cement of 20 percent strength. When ground in a device of the type described in my aforesaid patent, three hours is required. Longer grinding is required in a ball mill. The sole and heel of the form (or alternatively, the entire form) are dipped in this rubber cement, removed, allowed to semi-dry, dipped again and then completely dried.

The coated form is then heated to 160° F. and dipped into a latex of the following composition:

| | Parts by weight |
|---|---|
| Natural rubber latex [1] | 100 |
| Titanium dioxide | 20 |
| Clay (finely ground) | 5 |
| Brown pigment color | 3 |
| Zinc oxide | 3 |
| Sulfur | 1.1 |
| Zenite [2] | 1 |
| Zimate [3] | 0.05 |
| Age resistor 2246 [4] | 1 |

[1] 100 parts (dry weight) is used.
[2] Zenite is essentially the zinc salt of 2-mercaptobenzothiazole.
[3] Zimate is essentially zinc dimethyldithiodicarbamate.
[4] Age resistor 2246 is essentially 2,2'-methylene-bis(4-methyl-6-tert-butylphenol).

The various pigments are each finely ground before mixing with the latex.

The warm cement-covered form is dipped into this latex compound, removed and dried until it becomes semi-dried. Thereafter it is dipped into a coagulant such as one consisting of 100 g. ethyl alcohol, 40 g. calcium nitrate, 20 g. acetone, and 0.5 g. Emulphor A (an emulsifying agent and dispersant). After removing from the coagulant, and evaporation of the solvent, it is dipped again into the foregoing latex compound for 80 seconds. The completed dip is removed, dried, and cured 30 minutes at 240° F. After curing it is washed in water at 160° F. for 30 minutes, dried again, and then turned inside out as it is removed from the form.

*Example 2.—Gloves*

In making gloves or similar articles which have a tear-resistant surface, a porcelain form is dipped into a suspension of soapstone in alcohol, removed and dried. Subsequently, it is partly or entirely dipped into the following cement:

| | Parts by weight |
|---|---|
| Neoprene GN | 100 |
| Zinc oxide | 4 |
| Magnesia | 5 |
| Neozone D [1] | 2 |
| Clay (finely ground) | 10 |
| Reinforcing silica | 15 |
| Dibutyl phthalate | 1 |

[1] Neozone D is essentially phenyl-beta-naphthylamine.

The foregoing are dissolved in toluene to make a 30 percent cement and processed until finely ground. This takes three hours in a device of the type described in my aforesaid patent; much longer in a ball mill.

On removing the form, the solvent is evaporated, and the form warmed up to 160° F., for example, and dipped into the following 50 percent latex compound:

| | Parts by weight |
|---|---|
| Natural rubber latex | 100 |
| Sulfur | 2 |
| Zenite | 1 |
| Zinc oxide | 1 |
| Age resistor 2246 | 2 |
| Titanium dioxide | 12 |

After removal of the form, the film is semi-dried and re-dipped twice into the same compound at 63 percent concentration. Finally, the completed article is dried and cured for 25 minutes at 275° F. and removed from the form.

*Example 3.—Bands or belts which have a wear-resistant surface*

This example relates to a band or belt which has a specific property built into one surface. That surface is pigmented, the balance of the band or belt being unpigmented. The pigment may be an expensive coloring pigment or it may impart desirable physical properties to the surface of the band, as, for example, a reinforcing pigment which imparts wear-resistant properties. The band may be turned inside out so that either the inner or the outer surface is pigmented.

A highly polished cylindrical form is dipped into a suspension of 20 parts fine soapstone in 100 parts alcohol. After evaporating the solvent the form is dipped in a cement of the following composition:

| | Parts by weight |
|---|---|
| Neoprene GN | 100 |
| Zinc oxide | 4 |
| Magnesium oxide | 5 |
| Fine particle size furnace black | 60 |
| Paraffin wax | 3 |
| Stearic acid | 1 |
| Neozone D | 2 |

The foregoing composition is processed to a 30 percent concentration in toluene. This requires five hours in apparatus of the type described in my aforesaid patent, or much longer in a ball mill.

The form is dipped in the cement, removed, the solvent evaporated until semi-dried, dipped again and the solvent evaporated completely. Thereafter the form is heated up to 160° F. and dipped into the following latex compound:

| | Parts by weight (dry) |
|---|---|
| Neoprene type 571 | 100 |
| Zinc oxide | 5 |
| Semi-reinforcing furnace black | 10 |
| Clay (finely ground) | 10 |
| Neozone D | 2 |

After dipping into this compound the form is removed, semi-dried and dipped into a coagulant containing 80 g. of methyl alcohol, 20 g. ethyl alcohol, 30 g. acetone, and 35 g. calcium nitrate. On removal from this coagulant the solvent is evaporated, and the form is again dipped in the latex for 40 seconds. It is then dipped again in the coagulant, and after evaporation of the solvent, is finished by dipping again for 40 seconds in the neoprene latex. It is dried and then cured at 300° F. for 20 minutes, washed at 160° F. for 25 minutes and removed from the form.

Instead of dipping in the cement or latex, the whole or only limited areas may be sprayed with like results.

The examples are illustrative. The invention is defined in the claims that follow.

What I claim is:

1. A flexible article of wearing apparel composed of at least two adjacent laminae of vulcanized elastomeric film-forming materials each of substantial thickness, the film-forming constituent of the outer lamina being a cement-type elastomeric film former in a continuous phase in which pigment is uniformly dispersed in a very high state of microscopic homogeneity, and the film-forming constituent of an inner lamina being a discontinuous phase of coagulated latex particles.

2. The article of claim 1 which is composed of only two laminae.

3. The article of claim 1 which is an overshoe and the pigment is a reinforcing pigment present in sufficient quantity to provide a wear-resistant bottom surface on the overshoe.

4. The article of claim 1 which is a glove and the pigment is a reinforcing pigment present in sufficient quantity to provide a wear-resistant outer surface on the glove.

5. The article of claim 1 in which the pigment is carbon black.

6. The process of producing a product which comprises applying to a form a cement of a high molecular weight elastomeric film former in an organic solvent in which pigment is uniformly dispersed in a high state of microscopic homogeneity, evaporating solvent from the cement, dipping the cement-covered form in latex of a high molecular weight elastomeric film former, and thereafter removing the resulting dipped product from the form and turning it inside out and thereby obtaining a product with an outer pigmented ply of a cement-type elastomeric film former and an inner ply of coagulated latex particles, and vulcanizing the product.

References Cited by the Examiner

UNITED STATES PATENTS

| 2,175,801 | 10/1939 | Holden | 260—111 |
| 2,789,933 | 4/1957 | Bargmeyer. | |
| 2,989,755 | 6/1961 | O'Brien et al. | 36—168 |

EARL M. BERGERT, *Primary Examiner.*

C. B. COSBY, M. E. ROGERS, *Assistant Examiners.*